Sept. 12, 1967 W. P. WISSICK ETAL 3,341,824

UNIT UNAVAILABILITY DETECTOR FOR A DATA PROCESSING SYSTEM

Filed April 5, 1965 2 Sheets-Sheet 1

INVENTORS
OLIN L. MACSORLEY
WILLIAM P. WISSICK

BY Melvin P. Williams

ATTORNEY

United States Patent Office 3,341,824

Patented Sept. 12, 1967

3,341,824
UNIT UNAVAILABILITY DETECTOR FOR A DATA PROCESSING SYSTEM

William P. Wissick, Rhinebeck, and Olin L. MacSorley, Beacon, N.Y., assignors to International Business Machines Corporation, Armonk, N.Y., a corporation of New York Filed Apr. 5, 1965, Ser. No. 445,318
6 Claims. (Cl. 340—172.5)

ABSTRACT OF THE DISCLOSURE

A set of unit unavailability circuits are provided, one for each input/output unit of a data processing system, to operate in conjunction with an invalid unit address detector to indicate to the processing system when a function cannot be performed because of an inoperative, withdrawn or missing unit. A ready signal is supplied by each effective input/output unit and a test of the ready signal when a unit is signalled for selection will indicate an address exception to the system, thereby enabling corrective procedures to be taken and avoiding a system shutdown.

SPECIFICATION

This invention relates to data processing and more particularly to apparatus for detecting the unavailability of a modular unit of said system.

A data processing system is usually comprised of a plurality of units, the larger systems being composed of units which are somewhat independent of one another. For instance, a storage device is frequently a "stand alone" unit, having its own power supply circuits, and being built within its own framework, or in its own area of framework in proximity with the central processing unit. Similarly, input output devices are usually stand alone devices such as a card reader/punch, a tape drive unit, et cetera. In operating a system which includes independent units, it is desirable for the system to be able to detect when a unit has a power failure or when the unit may have been removed from system availability by maintenance personnel for maintenance purposes.

It is therefore a primary object of this invention to provide means, in a data processing system, for detecting the unavailability of an independent unit of said system.

Another object of the invention is to provide such a detecting system which will detect not only unavailability which is based upon failure of a unit, but to detect unavailability which has been created by operating personnel.

In accordance with the foregoing objects, the present invention provides means which will sense a failure of a unit of a data processing system, and further provides in conjunction with said failure sensing means, for detecting of a removal by operating personnel of the unit from system availability.

In a data processing system having a plurality of independent units which may be specified by address designations or other manifestations, it has been found that certain installations of a particular type of system may have more or less units than another installation of the same type of system. Therefore, some systems have provided means for testing addresses to determine the presence of a unit specified by each address, and providing an indication of an invalid address in the event that the particular installation of the system attempts to address one of the possible independent units which has not been provided in that installation. In one such system, a detection of an invalid address provides for an interruption to occur, the interruption being in the nature of a programming error type of interruption rather than a machine failure type of interruption. This makes it possible for the machine to recognize the fact that there is nothing basically wrong with the system, and that further instruction execution may therefore proceed without fear of erroneous results; this has the advantage of losing less computer time as a result of use of invalid addresses, and provides other advantages in the diagnostic and maintenance operations of the system.

A further object of the present invention is to provide a composite unit unavailability sensing circuit which will generate a manifestation of the unavailability of a unit whether that be due to the lack of provision of such a unit in a particular installation, due to the failure of the unit in operation, or due to the use of the unit by operating personnel for a purpose which makes the unit unavailable to the system.

In accordance with the present invention, an invalid address detecting circuit is combined with a circuit which is responsive to an operating personnel switch or to a failure of the unit in order to determine that a particular unit of the system is unavailable. In a specific embodiment, a single circuit is utilized to test for failure of the power supply of an independent unit, as well as to sense the operation of a switch by maintenance personnel, indicating that the unit is to be removed from system availability temporarily. This makes it possible for maintenance personnel to test or adjust a removed unit, without fear of intervention by the system, and without fear of causing erroneous operation within the system, while at the same time not causing the system to recognize the unavailability of that unit as a failure within the system. Thus, maintenance personnel can cause the computer to avoid references to the particular unit being worked on without causing the computer to shut down as if a failure had been sensed. Additionally, the same circuitry is utilized to handle a variety of causes of unavailability, avoiding the necessity of having duplicate or similar circuitry for the varous reasons for which the unit may have become unavailable. This results in a saving of money and space and provides for inherently greater reliability in the fewer circuits involved.

The present invention may be utilized in a system such as the one disclosed in a copending application of the same assignee filed on even date herewith in the name of O. L. MacSorley et al., entitled Large Scale Data Processing System, Ser. No. 445,326, filed Apr. 5, 1965. Application Ser. No. 445,326 is now abandoned and has been replaced by a continuation-in-part application Ser. No. 609,238, filed Jan. 13, 1967, by the same inventors and with the same title.

Other objects, features and advantages of the present invention will be more apparent in the light of the following detailed description of a preferred embodiment thereof as shown in the accompanying drawings.

Figure 1:
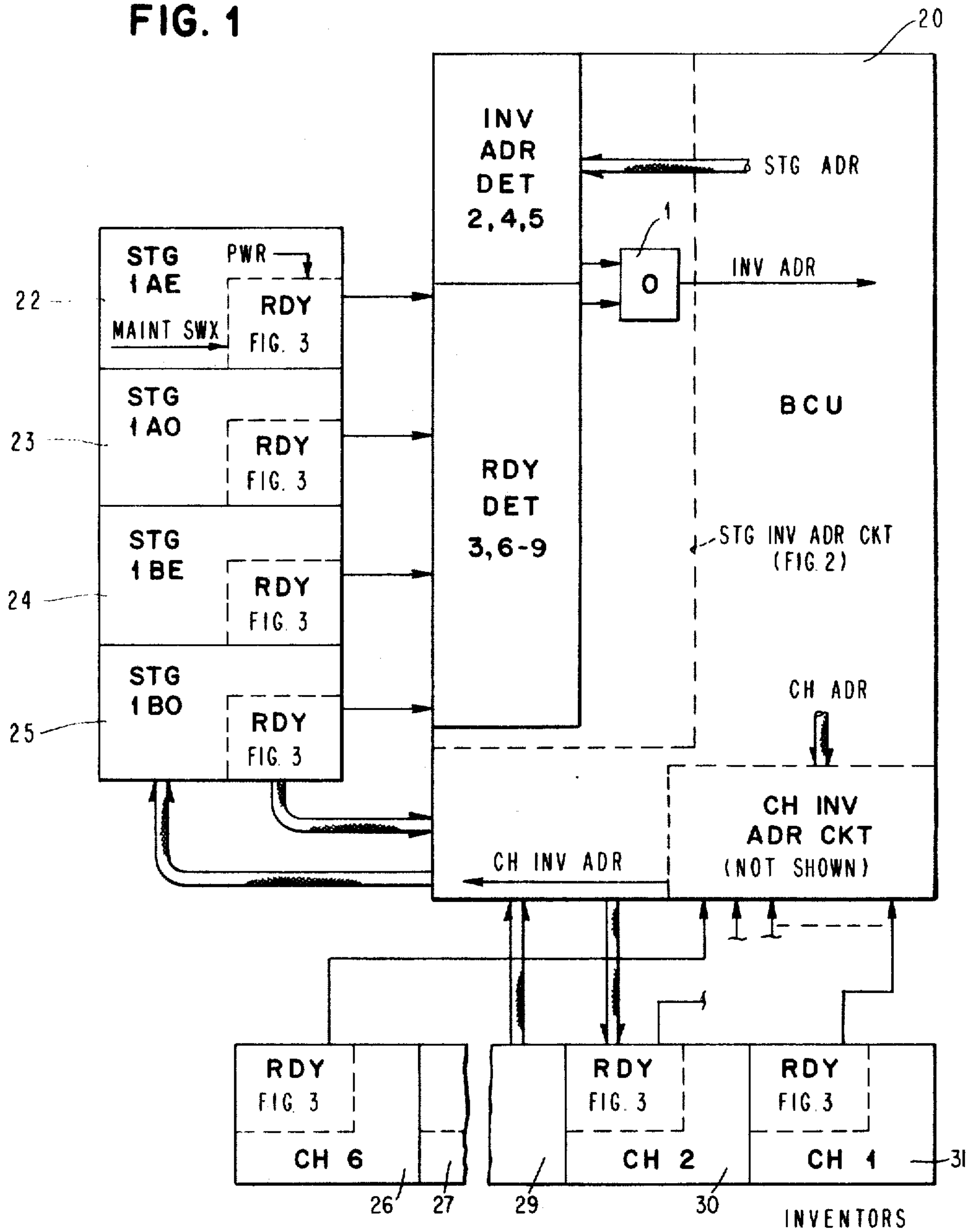
FIG. 1 is a simplified schematic block diagram of a system including a central processing unit and independent storage and channel units which illustrate one embodiment of the present invention.

Referring now to FIG. 1, a portion of a data processing system is shown to comprise a bus control unit (BCU)

20, a plurality of storage units (STG) 22–25, and a plurality of channel units 26–31. Channel, herein, means input/output control device. Each of the units 22–31 includes a ready circuit (RDY) which is shown in detail in FIG. 3. The BCU includes a storage invalid address circuit (STG INV ADR CKT) which is shown in FIG. 2.

The storage invalid address circuit includes an OR circuit 1 which is responsive to an invalid address detector 2, 4, 5 and to a ready detector 3, 6–9. Similarly, the BCU may contain a channel invalid address circuit (not shown elsewhere herein) which could be similar to or a variation of the storage invalid address circuit which is shown in FIG. 2.

Figures 2, 3, 4:
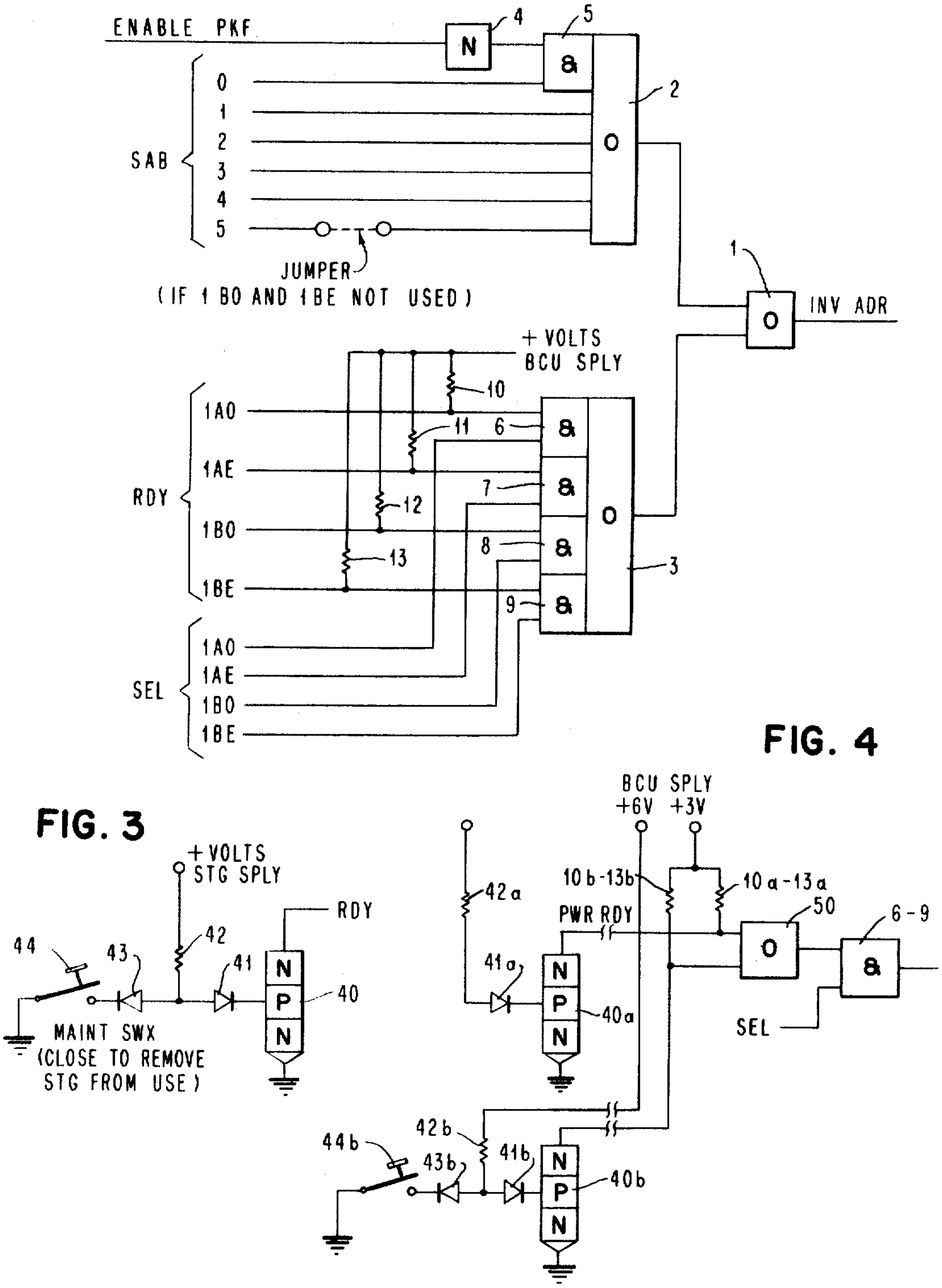
FIG. 2 is a diagram of an invalid address circuit for determining the unavailability of storage units due to lack of such a unit, failure of a unit, or operator intervention in accordance with the embodiment of the invention shown in FIG. 1.
FIG. 3 is a schematic diagram of a ready circuit which provides an indication of a failure or maintenance removal of a removed unit to the circuit of FIG. 2.
FIG. 4 is a diagram of a variation of the embodiment of FIG. 3.

The ready circuit shown in FIG. 3 is illustrative of one way in which the unavailability of a usually-available storage unit might be sensed. Specifically, the transistor 40 may have its emitter grounded and its collector connected to the ready line for the corresponding storage unit as shown in FIG. 2. Thus, the voltage supply of the bus control unit would provide power through one of the resistors 10–13 to operate the transistor 40. The base of the transistor is fed by a diode 41 which is connected to a junction between a resistor 42 and another diode 43. The resistor 42 is connected to the voltage supply of the storage unit. The diode 43 is connected to a maintenance switch which will cause the cathode of the diode 43 to be grounded when the switch is closed. In normal operation, the positive voltage of the storage supply is transmitted through the resistor 42 to the anode of the diode 41 so that the base of the transistor 40 is positive with respect to the emitter of the transistor 40 (which is grounded). Thus, the positive voltage supply of the BCU, which is transmitted over the ready line, causes current to flow through the transistor 40 and through the corresponding one of the resistors 10–13 (FIG. 2). This causes a potential drop across the corresponding resistor 10–13 so that the input to the related AND circuit 6–9 (FIG. 2) is negative and therefore the related AND circuit will not conduct. However, assuming that there is a failure in the storage voltage supply (FIG. 3) then there will be no positive potential applied by the resistor 42 to the anode of the diode 41; thus, the base of the transistor 40 will no longer be positive, and the transistor will cease to conduct current. With no current flow in the ready line, there will be no current flow through the related resistor 10–17 so that the full positive potential of the bus control unit voltage supply will be supplied to one input of the corresponding AND circuit 6–9 (FIG. 2). Thus, the related AND circuit will now be ready to be operated provided that a select signal (SEL) is received for the corresponding storage unit meaning that an attempt to reference that storage unit is being made.

The ready circuit of FIG. 3 is also operable by the maintenance switch which, when closed, will ground the cathode of the diode 43 so that the diode will then conduct current from the storage voltage supply through the resistor 42 to ground. This causes a potential drop across the resistor 42 so that the anode of the diode 41 will now become more negative, which in turn causes the base of the transistor 40 to be negative so that it will no longer conduct. Thus, the effect of closing the maintenance switch is the same as the effect of losing the positive voltage supply.

The foregoing detailed description is illustrative merely, there being a variety of ways in which failure of an independent unit or maintenance removal of an independent unit from system availability may be sensed in accordance wtih this invention. Furthermore, it should be understood that although the storage units were taken as an example, similar circuitry could be provided by those skilled in the art to detect unavailable channels. The invention may be practiced with respect to other units of the system, and could be adapted so as to sense indications in remote units other than those which are sensed by the ready circuit of FIG. 3.

In FIG. 4, the transistor 40*a* senses storage power failures only, and the transistor 40*b* senses maintenance switch operation only.

Although there has been shown and described exemplary embodiments of the present invention, it should be obvious to those skilled in the art that the foregoing and other changes may be made in the present invention without departing from the spirit and scope thereof which is to be limited only as set forth in the following claims.

What is claimed is:

1. In a data processing system having storage means containing a plurality of addressable storage locations, said storage means being comprised of portions, said portions being distinguishable by address manifestations, said data processing system including addressing means capable of specifying addresses for portions of a storage means not included within the particular configuration of said system, said system also including means to generate a manifestation for application to individual storage portions to indicate the selection of that storage portion for operation, said data processing system further including address monitoring means to sense the presentation of address manifestations which specify storage portions not included within said system and invalid address manifestation generating means responsive thereto generate an invalid address manifestation, a storage monitoring device, comprising:

a plurality of circuit means, one for each of said storage portions, each of said circuit means normally at a potential of a first kind, said circuit means assuming a potential of a second kind in dependence upon the unavailability of that portion due to a power failure or maintenance action;

and means responsive to said circuit means and to said selection manifestations to generate an unavailable storage manifestation in dependence upon the concurrent presence of a signal of said second kind and a selection manifestation corresponding to the related storage portion, said means causing said invalid address manifestation generating means to generate an invalid address signal in response to said unavailable storage manifestation.

2. In a data processing system comprising at least first and second units, a detection circuit, comprising:

a dynamic switching element, a source of potential, and a ready line interconnecting said source of potential and said switching element, said switching element so arranged as to conduct current through said ready line to said source of potential when in a conducting mode, said source of potential being provided by said first unit;

a second source of potential in said second unit;

a switch means in said second unit, said switch means being settable to an open and a closed state;

and control means for said switching element responsive to said second source of potential and said switch means and so oriented with respect thereto as to cause said switching element to be in a conductive state when said switch means is in said open state and said second source of potential is operative, and so arranged as to render said switching element operative in the other one of said modes otherwise.

3. In a data processing system comprising a central unit and a plurality of other units, said system capable of addressing a number of units in excess of said plurality, a unit unavailability detecting apparatus, comprising:

means for sensing an address designation relating to a unit not included within said plurality of units;

a plurality of means, one for each of said units, each for sensing an operational failure in the corresponding unit;

a plurality of operative means, one for each of said units, each operable into first and second states for designating the availability or lack of availability, alternatively, of said device;

and means responsive to said last three means to generate a manifestation of an unavailable unit in response to the operation of any one of said last named three means.

4. In a data processing system having storage means containing a plurality of addressable storage locations, said storage means being comprised of portions, said portions being distinguishable by address manifestations, said data processing system including addressing means capable of specifying addresses for portions of a storage means not included within the particular configuration of said system, said system also including means to generate a manifestation for application to individual storage portions to indicate the selection of that storage portion for operation, said data processing system further including address monitoring means to sense the presentation of address manifestations which specify storage portions not included within said system and invalid address manifestation generating means responsive thereto to generate an invalid address manifestation, a storage monitoring device, comprising:

means for sensing an address designation relating to a unit not included within said plurality of units;

a plurality of means, one for each of said units each for sensing an operational failure in the corresponding unit;

a plurality of operative means, one for each of said units, each operable into first and second states for designating the availability or lack of availability, alternatively, of said device;

and means responsive to said last three means to generate a manifestation of an unavailable unit in response to the operation of any one of said last named three means.

5. In a data processing system having storage means containing a plurality of addressable storage locations, said storage means being comprised of portions, said portions being distinguishable by address manifestations, said data processing system including addressing means capable of specifying addresses for portions of a storage means not included within the particular configuration of said system, said system also including means to generate a manifestation for application to individual storage portions to indicate the selection of that storage portion for operation, said data processing system further including address monitoring means to sense the presentation of address manifestations which specify storage portions not included within said system and invalid address manifestation generating means responsive thereto to generate an invalid address manifestation, a storage monitoring device, comprising:

a plurality of maintenance switches, one for each of said storage portions, each settable into either one of two states, one of said states causing the generation of a maintenance manifestation indicating the unavailability of that portion;

and means responsive to said maintenance manifestation and to said selection manifestations to generate an unavailable storage manifestation in dependence upon the concurrent presence of a maintenance manifestation and a selection manifestation corresponding to the related storage portion, said means causing said invalid address manifestation generating means to generate an invalid address signal in response to said maintenance manifestation.

6. In a data processing system having storage means containing a plurality of addressable storage locations, said storage means being comprised of portions, said portions being distinguishable by address manifestations, said data processing system including addressing means capable of specifying addresses for portions of a storage means not included within the particular configuration of said system, said system also including means to generate a manifestation for application to individual storage portions to indicate the selection of that storage portion for operation, said data processing system further including address monitoring means to sense the presentation of address manifestations which specify storage portions not included within said system and invalid address manifestation generating means responsive thereto to generate an invalid address manifestation, a storage monitoring device, comprising:

a plurality of circuit means, one for each of said storage portions, each of said circuit means normally at a potential of a first kind, said circuit means assuming a potential of a second kind in dependence upon the unavailability of that portion due to a power failure or maintenance action;

a plurality of maintenance switches one for each of said storage portions, each settable into either one of two states, one of said states causing the generation of a maintenance manifestation indicating the unavailability of that portion;

and means responsive to said circuit means, said maintenance manifestations, and to said selection manifestations to generate an unavailable storage manifestation in dependence upon the concurrent presence of a signal of said second kind and a selection manifestation corresponding to the related storage portion, or in dependence upon the concurrent presence of one of said maintenance manifestations and a selection manifestation corresponding to the related storage portion, said means causing said invalid address manifestation generating means to generate an invalid address signal in response to said unavailable storage manifestation.

No references cited.

ROBERT C. BAILEY, *Primary Examiner.*

R. B. ZACHE, *Assistant Examiner.*